United States Patent [19]

Andes

[11] 4,410,910
[45] Oct. 18, 1983

[54] MOTION DETECTING METHOD AND APPARATUS

[75] Inventor: Charles B. Andes, Tempe, Ariz.

[73] Assignee: Advanced Diagnostic Research Corp., Tempe, Ariz.

[21] Appl. No.: 188,270

[22] Filed: Sep. 18, 1980

[51] Int. Cl.³ .............................................. H04N 7/18
[52] U.S. Cl. .................................... 358/105; 73/626
[58] Field of Search .................. 358/112, 105; 73/621, 73/626; 364/516; 128/782

[56] References Cited

U.S. PATENT DOCUMENTS

| 3,789,833 | 2/1974 | Bom ........................................ 73/626 |
| 3,881,466 | 5/1975 | Wilcox ................... 73/626 |
| 4,149,419 | 4/1979 | Connell ................... 73/626 |
| 4,219,847 | 8/1980 | Pinkney ............................. 358/105 |
| 4,270,143 | 5/1981 | Morris ................................ 358/105 |
| 4,301,471 | 11/1981 | Holscher ............................ 358/105 |

Primary Examiner—Howard Britton
Attorney, Agent, or Firm—Christie, Parker & Hale

[57] ABSTRACT

To detect motion of an object, a repetitive video signal representative of the object at successive points in time is generated. At least a portion of successive repetitions of the video signal is integrated. The successive integrations are compared with each other. The integrated portion is preferably selected to optimize motion detection for the size and extent of movement of the object.

10 Claims, 6 Drawing Figures

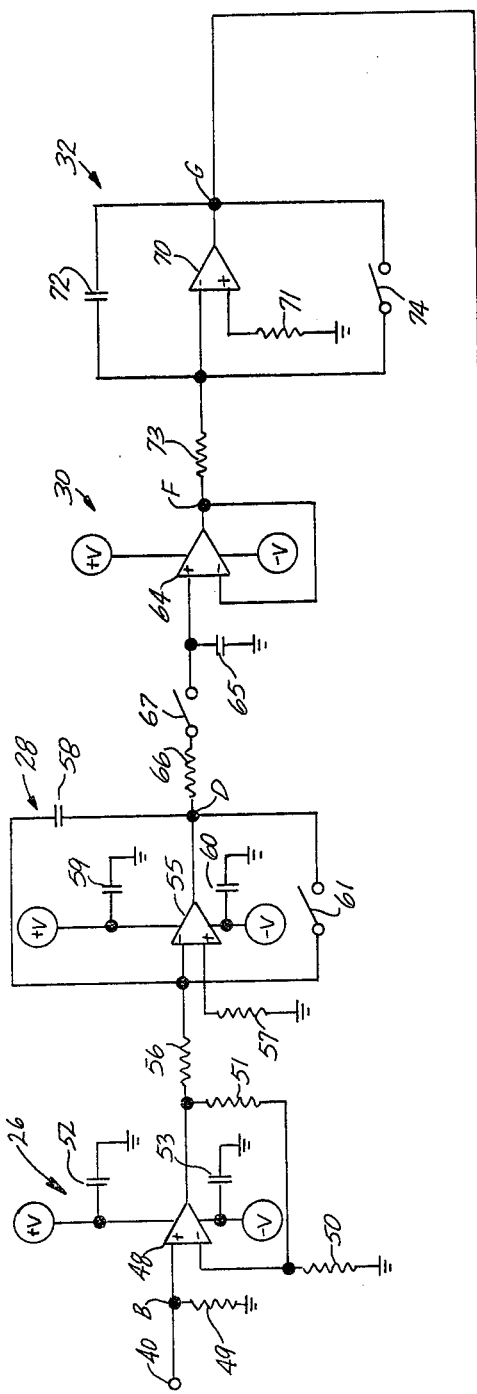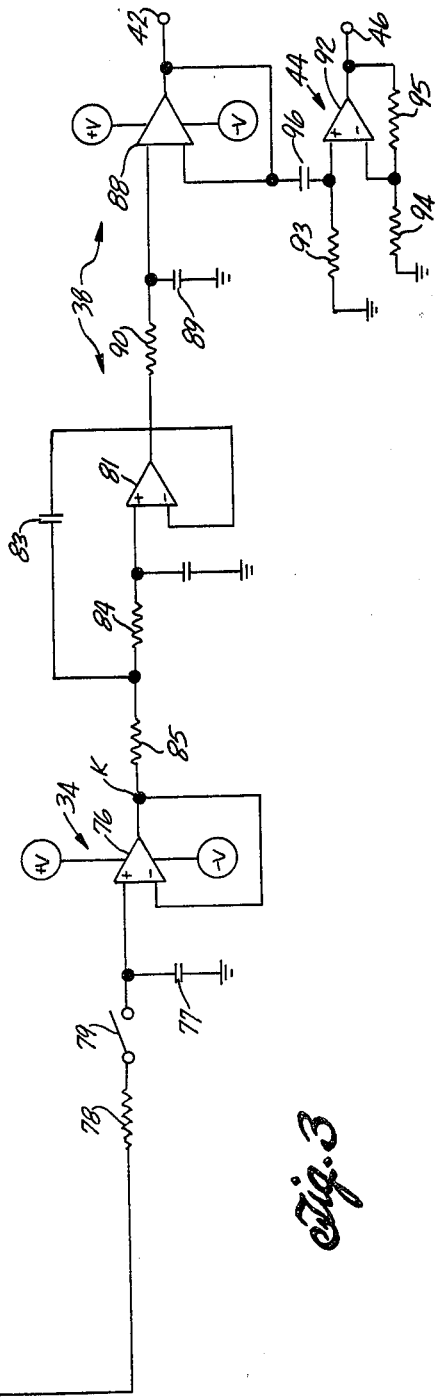
Fig. 3

Fig. 6
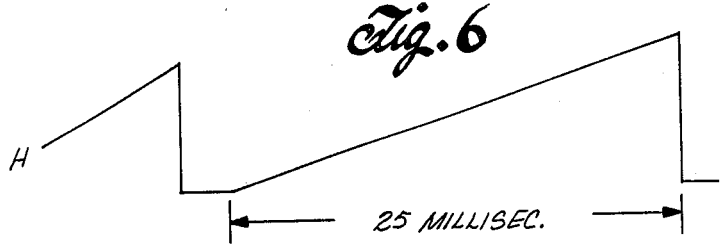
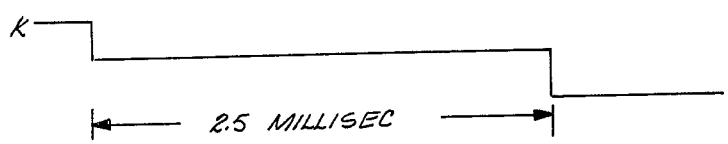
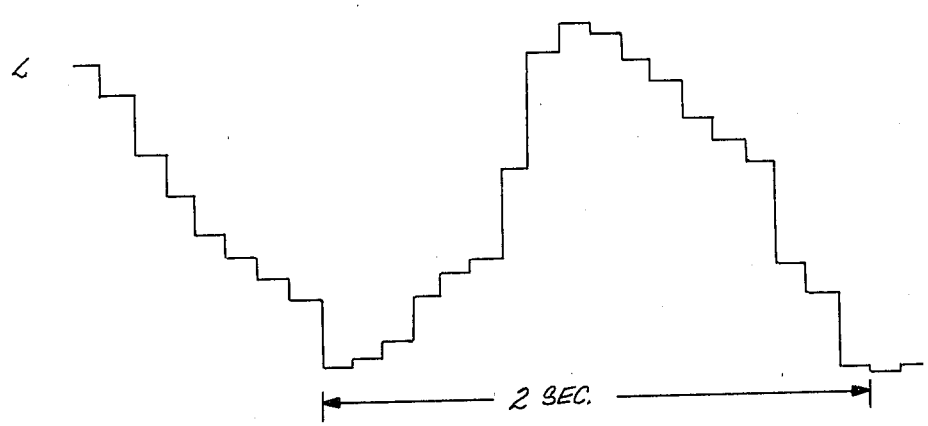

4,410,910

MOTION DETECTING METHOD AND APPARATUS

BACKGROUND OF THE INVENTION

This invention relates to the analysis of video signals and, more particularly, to a method and apparatus for reliably detecting motion of an object represented by a video signal.

In a number of diverse arts such as television, radar, and ultrasonic medical diagnosis, a video signal represents an image or object to be portrayed on a cathode ray tube or other display device. In a two-dimensional display, the video signal is composed of a plurality of adjacent lines that form repetitive frames representing the image or object at successive points in time. To increase the information that can be extracted from a video signal, the video signal can be processed in various ways. For example, the image appearing on the display can be enhanced.

For the purpose of medical diagnosis, it is frequently necessary to determine the movement of body organs such as heart rate and breathing characteristics. In the past, motion detection of body organs has been accomplished ultrasonically with an A-scan. But for many other viewing purposes, a B-scan or a sector scan is preferred to an A-scan in ultrasound diagnosis. Thus, separate ultrasound apparatus had to be employed to view images of body organs and to detect their motion.

SUMMARY OF THE INVENTION

The invention permits motion of an object to be detected by processing a video signal representative of an image including the object. In the case of an ultrasound B-scanner or sector scanner, little additional equipment is required to detect movement of an object.

One aspect of the invention is a method for detecting motion of an object comprising the steps of generating a repetitive video signal representative of the object at successive points in time, integrating at least a portion of successive repetitions of the video signal, and comparing the successive integrations with each other. In most cases, the video signal is composed of a plurality of adjacent lines that form repetitive frames and the integrating step integrates the same portion of a number of adjacent lines fewer than the said plurality of lines that form a frame. Preferably, the method also comprises the step of changing the integrated portion of each line and/or the number of integrated lines to optimize motion detection for the size and extent of movement of the object.

Another aspect of the invention is apparatus for detecting motion of an object represented by a video signal composed of a plurality of lines forming frames at successive points in time. An integrator integrates a portion of each line of the video signal during a first integrating period to form a line integration signal. A sample and hold circuit stores the value of the line integration signal at the end of each first integrating period to form a line summation signal. Another integrator integrates the line summation signal during a second integrating period equal to a plurality of lines of each frame of the video signal to form a frame integration signal. Another sample and hold circuit stores the value of the frame integration signal at the end of each second integrating period to form a frame summation signal. When the apparatus is employed to detect motion of body organs, a filter preferably separates the high-frequency components of the frame summation signal from the remainder thereof so as to isolate pulse rate data.

BRIEF DESCRIPTION OF THE DRAWINGS

The features of a specific embodiment of the best mode contemplated of carrying out the invention are illustrated in the drawings, in which:

FIG. 3 is a schematic circuit diagram of part of the motion detector in FIG. 1;

FIGS. 5 and 6 are diagrams of waveforms representing the signals generated by the motion detecting circuitry of FIGS. 3 and 4.

DETAILED DESCRIPTION OF THE SPECIFIC EMBODIMENT

Figure 1:
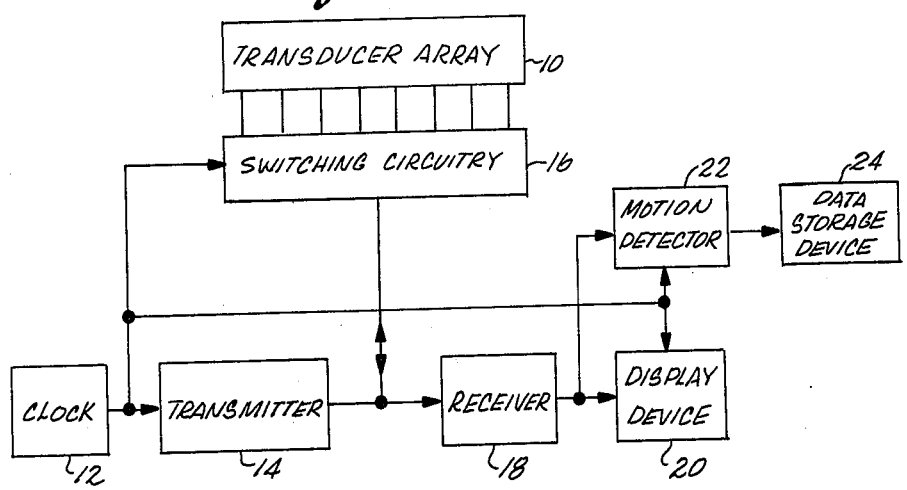
FIG. 1 is a real-time ultrasonic scanner for medical diagnosis incorporating the principles of the invention.

In FIG. 1, an ultrasonic transducer array 10 comprises a plurality of piezoelectric crystals arranged in a row. Under the control of a clock 12, a transmitter 14 generates pulses that excite the crystals of array 10. The pulses from transmitter 14 are distributed to selected crystals of array 10 by switching circuitry 16, which is also controlled by clock 12. The selectively excited crystals of array 10 each emit a burst of ultrasonic energy and the resulting echoes are delivered by switching circuitry 16 to a receiver 18. Receiver 18 produces a video signal that drives a display device 20 such as a cathode ray tube. Display device 20 presents the video signal on its screen in lines and frames under the control of clock 12. As described to this point, the real-time ultrasonic scanner is conventional, it could be a linear scanner of the type described in Bom U.S. Pat. No. 3,789,833 or Wilcox U.S. Pat. No. 3,881,466 or a sector scanner as disclosed in Connell et al U.S. Pat. No. 4,149,419 or an article by J. C. Somer in *Ultrasonics*, July, 1968, pages 153–159, entitled "Electronic Sector Scanning for Ultrasonic Diagnosis." The disclosures of these patents are incorporated herein fully by reference.

Figure 2:
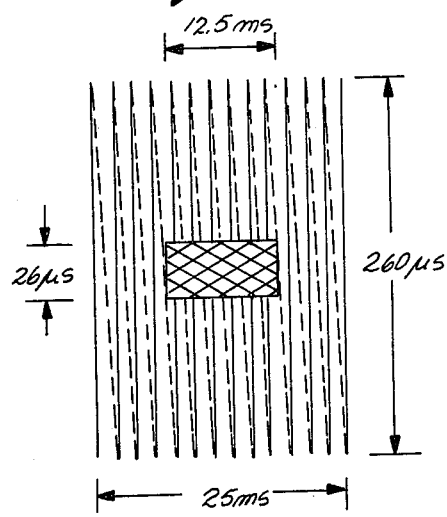
FIG. 2 is a diagram depicting the screen of the display device in FIG. 1.

Assuming the scanner of FIG. 1 is a linear scanner, FIG. 2 represents a typical raster for display device 20. The raster has 64 vertical lines per frame, each line being 260 microseconds across with a 130 microsecond flyback for a total 390 microseconds in duration and 40 frames per second, each frame being 25 milliseconds in duration. For simplicity, fewer lines are illustrated in FIG. 2. For such a raster, clock 12 has a frequency of 2560 Hz.

With reference to FIG. 1, the invention calls for a motion detector 22 connected to receiver 18 to process the video signal and a data storage device such as a chart recorder, cathode ray tube with memory capability, or photographic recording system for storing the output of motion detector 22. Under the control of clock 12, motion detector 22 detects movement of the image or an object in the image represented by the video signal from receiver 18, which is composed of a plurality of lines corresponding to the raster of FIG. 2 and forming repetitive frames at successive points in time. A portion of a number of adjacent lines of the video signal is integrated on a frame-by-frame basis by motion detector 22. With reference to FIG. 2, the cross-hatched area, called hereafter the integrated area, represents the portion of the video signal that is integrated by motion detector 22. In this particular case, 10% of each line centered vertically, i.e., a duration of 26 microseconds, is integrated, and half the lines centered horizontally, i.e., a duration of 12.5 milliseconds, are integrated. (An integrated area with this size and screen location has been found to be optimum for monitoring fetal heart motion.) Any movement in the portion of the image in the integrated area results in a change in the value of the integration from frame to frame. Thus, movement in the integrated area is detected by comparing the value of the integration signal on a frame-by-frame basis. The size of the integrated area depends upon the size and the extent of motion of the object being detected. In general, the smaller the integrated area, the more sensitive is the motion detector to movement of a particular object in the total image and the larger the integrated area, the easier it is to track motion of an object being detected. Therefore, the integrated area is selected to optimize motion detection for the size and extent of motion of the object.

Data storage device 24 facilitates comparison of the integration values for successive frames of the video signal.

Figure 4:
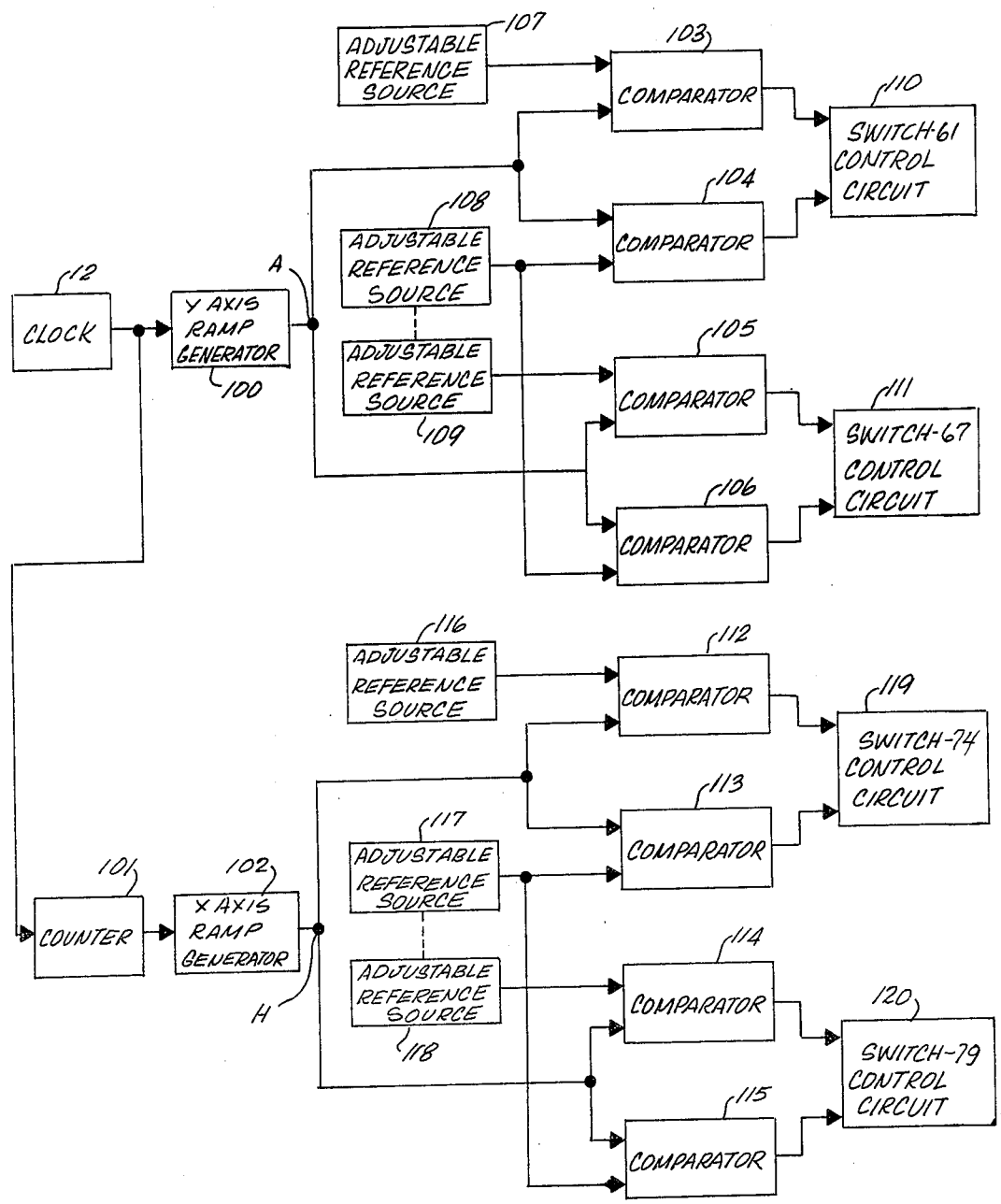
FIG. 4 is a schematic block diagram of the remainder of the motion detector in FIG. 1.

Reference is made to FIGS. 3 and 4 for a description of the electronic circuitry comprising motion detector 22. In FIG. 3, an amplifier 26, an integrator 28, a sample and hold circuit 30, an integrator 32, a sample and hold circuit 34, and a low-pass filter 38 are connected between an input terminal 40 and an output terminal 42. A high-pass filter 44 is connected between output terminal 42 and an output terminal 46.

Amplifier 26 comprises an operational amplifier stage 48 having a positive input connected to ground by a resistor 49, a negative input connected to ground by a resistor 50, and an output connected to the negative input by a feedback resistor 51. Stage 48 is powered by a positive source of bias potential +V and a negative source of bias potential −V. A capacitor 52 is connected from source +V to ground and a capacitor 53 is connected from source −V to ground. Input terminal 40 is connected to the positive input of amplifier stage 48.

Integrator 28 comprises an operational amplifier stage 55 having a negative input to which the output of stage 48 is connected by a resistor 56, a positive input connected by a resistor 57 to ground, and an output connected to the negative input by a feedback capacitor 58. Stage 55 is also powered by bias sources +V and −V. A capacitor 59 is connected from source +V to ground and a capacitor 60 is connected from source −V to ground. A switch 61 is connected in parallel with capacitor 58. When switch 61 is open by virtue of capacitor 58, stage 55 integrates the signal applied to input terminal 40. The result is a line integration signal at the output of stage 55. When switch 61 is closed, thereby short circuiting capacitor 58, the output of amplifier stage 55 sits at a reference potential.

Sample and hold circuit 30 comprises an amplifier stage 64 having a positive input connected by a capacitor 65 to ground, a negative input, and an output directly connected to the negative input. Stage 64 is powered by bias sources +V and −V. The output of stage 55 is connected by a resistor 66 and a switch 67 to the positive input of stage 64. When switch 67 is closed, the value of the integration signal at the output of amplifier stage 55 is sampled and transferred to capacitor 65. When switch 67 is open, the transferred value is held, i.e., stored, across capacitor 65. The signal at the output of stage 64, called hereafter the line summation signal, is representative of the integration value from stage 55 at the end of each integration period of integrator 28.

Integrator 32 comprises an amplifier stage 70 having a positive input connected to ground by a resistor 71, a negative input, and an output connected to the negative input by a feedback capacitor 72. The output of stage 64 is connected by a resistor 73 to the negative input of stage 70. A switch 74 is connected in parallel with capacitor 72. Amplifier stage 70 is powered by sources +V and −V; the connections thereto are not shown because it is assumed that stages 64 and 70 are on the same integrated circuit chip. When switch 74 is open by virtue of capacitor 72, stage 70 integrates the line summation signal at the output of amplifier stage 64. The result is a frame integration signal at the output of stage 70. When switch 74 is closed, thereby short circuiting capacitor 72, the output of amplifier stage 70 sits at a reference level.

Sample and hold circuit 34 comprises an amplifier stage 76 having a positive input coupled by a capacitor 77 to ground, a negative input, and an output directly connected to the negative input. Stage 76 is powered by sources +V and −V. The output of stage 70 is connected by a resistor 78 and a switch 79 to the positive input of stage 76. When switch 79 is closed, the integrated value at the output of amplifier stage 70 is sampled and transferred to capacitor 77. When switch 79 is open, the transferred value is held, i.e., stored across capacitor 77. The signal at the output of stage 76, called hereafter the frame summation signal, is representative of the integration value from stage 70 at the end of each integration period of integrator 32.

Low-pass filter 38 comprises amplifier stages 81 and 88. Stage 81 has a positive input connected by a capacitor 82 to ground, a negative input, and an output directly connected to the negative input. The output of stage 81 is also connected by a capacitor 83 and a resistor 84 in series to the positive input thereof. The output of stage 76 is connected by a resistor 85 to the junction of capacitor 83 and resistor 84. Stage 81 is powered by sources +V and −V; the connections thereto are not shown because it is assumed that stages 76 and 81 are on the same integrated circuit chip. Amplifier stage 88 has a positive input connected by a capacitor 89 to ground, a negative input, and an output directly connected to output terminal 42 and the negative input. A resistor 90 connects the output of stage 81 to the positive input of stage 88. Stage 88 is powered by sources +V and −V.

High-pass filter 44 comprises an amplifier stage 92 having a positive input connected by a resistor 93 to ground, a negative input connected by a resistor 94 to ground, and an output connected by a resistor 95 to the negative input and directly connected to output terminal 46. A capacitor 96 connects the output of stage 88 to the positive input of stage 92. Stage 92 is powered by sources +V and −V; the connections thereto are not shown because it is assumed that stages 88 and 92 are on the same integrated circuit chip.

In FIG. 4, clock 12, also shown in FIG. 1, triggers a Y-axis ramp generator 100 and steps a counter 101. Counter 101 triggers an X-axis ramp generator 102. Generator 100 is the same or a duplicate of the circuitry in display device 20 that controls the Y-axis deflection and counter 101 and ramp generator 102 are the same or duplicates of the circuitry in display device 20 that controls the X-axis deflection. Thus, the ramps at the output of generator 100 correspond to the individual lines of the video signal and the display device and the ramps at the output of generator 102 correspond to the individual frames of the video signal and the display device. Assuming 60 lines per frame, counter 101 triggers generator 102 after every 60 pulses from clock 12. The output of ramp generator 100 is coupled to one input of each of comparators 103, 104, 105, and 106. An adjustable reference source 107 is coupled to the other input of comparator 103, an adjustable reference source 108 is coupled to the other input of comparator 104 and the other input of comparator 106, and an adjustable reference source 109 is coupled to the other input of comparator 105. As indicated by a dashed line between reference sources 108 and 109, they are ganged together so that the reference signals at their outputs are always offset by a predetermined amount, the reference signal at the output of source 108 being larger. The outputs of comparators 103 and 104 are coupled to a switch control circuit 110, which actuates switch 61. The outputs of comparators 105 and 106 are coupled to a switch control circuit 111, which actuates switch 67. Similarly, the output of ramp generator 102 is coupled to one input of each of comparators 112, 113, 114, and 115. An adjustable reference source 116 is coupled to the other input of comparator 112, an adjustable reference source 117 is coupled to the other input of comparator 113 and the other input of comparator 115, and an adjustable reference source 118 is coupled to the other input of comparator 113. The outputs of comparators 112 and 113 are coupled to a switch control circuit 119, which actuates switch 74. The outputs of comparators 114 and 115 are coupled to a switch control circuit 120, which actuates switch 79. As indicated by a dashed line between reference sources 117 and 118, they are ganged together so that the reference signals at their outputs are always offset from each other by a predetermined amount, the reference signal at the output of source 117 being larger.

Figure 5:
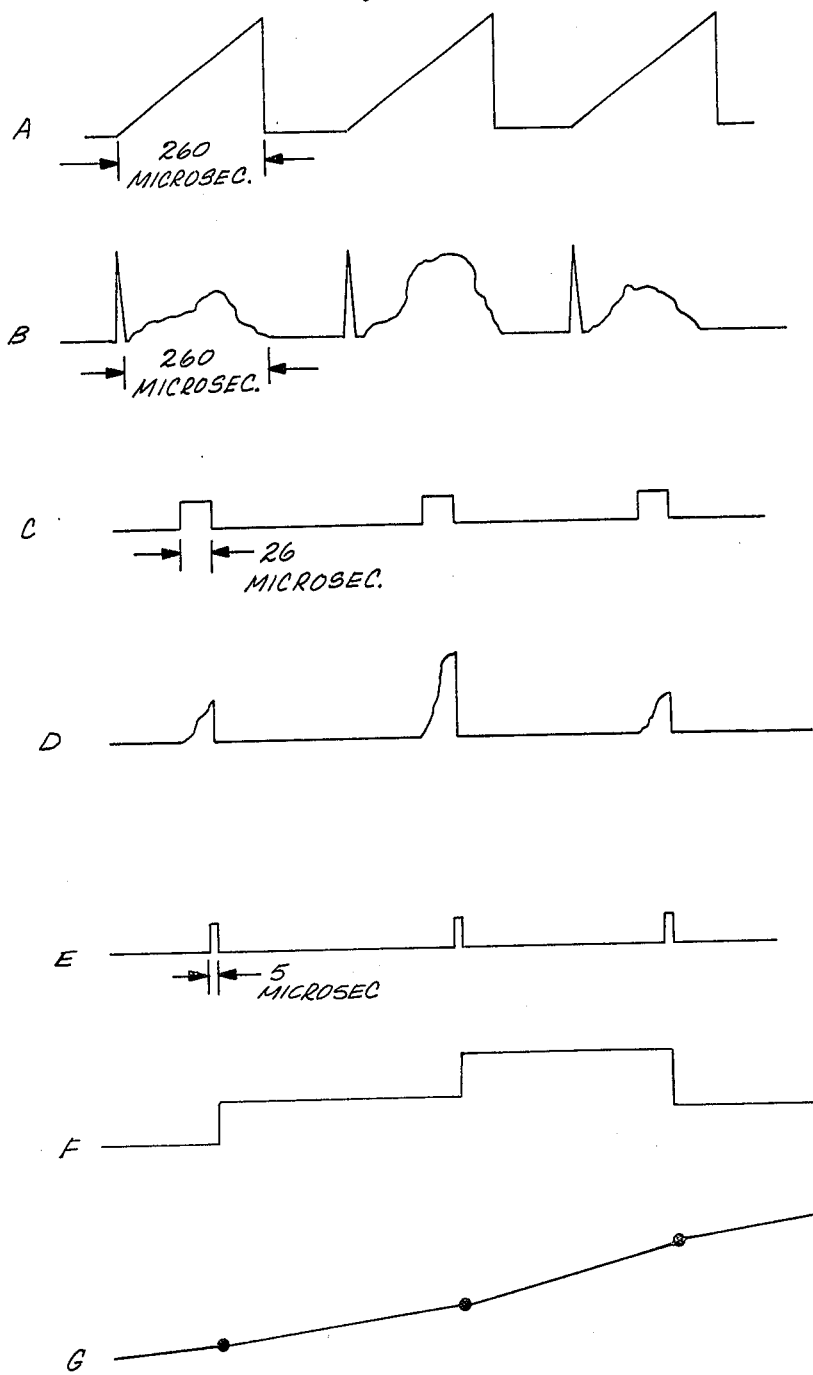

Reference is made to waveforms A through L in FIGS. 5 and 6 for a description of the operation of the circuitry of FIGS. 3 and 4. The location of each waveform is identified in FIGS. 3 and 4 by the appropriate letter A through L. In waveforms A through L, the baseline represents ground potential and the signals represent positive potential. When positive pulses are present in waveforms C and E, integrators 28 and 32, respectively, are operating, i.e., integrating, and when waveforms C and E are at ground potential the integrators are reset. During the integration interval, the integration values of integrators 28 and 32 are continually increasing because the integrated signals have positive polarity. Similarly, when positive pulses are present in wave forms E and J, sample and hold circuits 30 and 34, respectively, are sampling, and when waveforms E and J are at ground potential these circuits are holding. Waveform A represents the output signal from ramp generator 100. The period thereof corresponds in duration to one line of the video signal. The pulses of waveform C represent the time intervals during which switch 61 is open, i.e., the integrating periods of integrator 28. These time intervals correspond to the integrated protion of each line of the video signal, i.e., the vertical length of the integrating area in FIG. 2. When the ramp signal from generator 100 is equal in value to the reference signal from source 107, comparator 103 transmits a pulse to switch control circuit 110, which opens switch 61. When the ramp signal from generator 100 reaches a higher value, which is equal to the reference signal from source 108, comparator 104 transmits a pulse to switch control circuit 110 to close switch 61 until the pulse transmitted by comparator 103 during the next line of the video signal. Waveform B represents the video signal applied to input terminal 40. The regularly occurring pulses therein derive from the pulses produced by transmitter 14 (FIG. 1). Between each pair of these regularly occurring pulses, the video signal represents one line of the image portrayed on the screen of display device 20. Waveform D represents the line integration signal at the output of integrator 28; as illustrated thereby, the line integration signal represents the integral of the portion of each line of the video signal while switch 61 is open, i.e., during the pulses of waveform C. When the ramp signal from generator 100 reaches the value of the reference signal from source 109, which is slightly less than the value of the signal from source 108, comparator 105 transmits a pulse to switch control circuit 111 to close switch 67. When the ramp signal from generator 100 reaches the value of the reference signal from source 108 a short time later, e.g., 5 microseconds, comparator 106 transmits a pulse to switch control circuit 111 to open switch 67. The pulses of waveform E represent the time intervals during which switch 67 is closed. Waveform F represents the line summation signal at the output of sample and hold circuit 30. As illustrated, each time switch 67 closes, i.e., a pulse appears in waveform E, the value of the line integration signal at the output of integrator 28 is transferred to sample and hold circuit 30, where it is stored until the next closure of switch 67.

Waveform H represents the output signal from ramp generator 102. The period thereof corresponds in duration to one frame of the video signal. The pulses of waveform I represent the time intervals during which switch 74 is open, i.e., the integrating periods of integrator 32. The time intervals correspond to the number of integrated lines in each frame of the video signal, i.e., the horizontal width of the integrated area of FIG. 2. When the ramp signal from generator 102 is equal in value to the reference signal from source 116, comparator 112 transmits a pulse to switch control circuit 119, which opens switch 74. When the ramp signal from generator 102 reaches a higher value, which is equal to the reference signal from source 117, comparator 113 transmits a pulse to switch control circuit 119 to close switch 74 until the pulse transmitted by comparator 112 during the next frame of the video signal. Waveform G represents the frame integration signal at the output of integrator 32; as illustrated thereby, the frame integration signal represents the integral of the line summation signal from sample and hold circuit 30, while switch 74 is open, i.e., during the pulses of waveform I. When the ramp signal from generator 102 reaches the value of the reference signal from source 118, which is slightly less than the value of the refernece signal from source 117, comparator 114 transmits a pulse to switch control circuit 120 to close switch 79. When the ramp signal from generator 100 reaches the value of the reference signal from source 117 a short time later, e.g., 5 microseconds, comparator 115 transmits a pulse to switch control circuit 120 to open switch 79. The pulses of waveform J represent the time intervals during which switch 79 is closed. Waveform K represents the frame summation signal at the output of sample and hold circuit 34. As illustrated, each time switch 79 closes, i.e., a pulse appears in waveform J, the value of the frame intergration signal at the output of integrator 32 is transferred to sample and hold circuit 34, where it is stored until the next closure of switch 79. Waveform L represents the frame summation signal at the output of sample and hold circuit 34 over a long period of time, i.e., more than two seconds, to illustrate a typical breathing waveform, in a case where the object being detected is a body organ that moves during breathing. Although there would be 80 discontinuities in the breathing waveform during a period of two seconds because the video signal has a frame rate of 40 per second, fewer discontinuities are shown in waveform L for clarity.

Filter 30 has a low-pass characteristic designed to smooth out the steps of the frame integration signal illustrated in waveform L; it could, for example, be designed to cut off at 4 or 5 Hz. Filter 44 has a high-pass characteristic designed to cut off at 1 Hz so as to isolate heart pulsations from breathing motion for transmission to output terminal 46.

Output terminals 42 and 46 are coupled to data storage device 24 to facilitate comparison of the integration values on a frame-to-frame basis as represented by the filtered frame summation signal for the purpose of detecting movement of the image or an object in the image represented by the video signal. Thus, for example, the breathing wave of waveform L after eliminating the steps by filtering could be reproduced by a chart recorder for analysis by a medical specialist; the heart pulsations isolated by filtering could be similarly reproduced by the same chart recorder.

Switch control circuits 110, 111, 119, and 120 could be flip-flops if switches 61, 67, 74, and 79 are electronic switches and could be latching relay coils if these switches are mechanical.

By way of example, the components shown in FIG. 3 could have the following values:

Resistor 49—20K, 1%
Resistors 50, 51, 57, 66, 71, 78, 94—1K, 1%
Resistor 56—3160 ohms, 1%
Resistors 73, 84, 85—100K, 1%
90—100K, 1%
Resistor 93—475K, 1%
Resistor 95—10K, 1%
Capacitors 52, 53, 59, 60, 72—0.1 microfarad
Capacitor 58, 65—0.01 microfarad
Capacitor 77—0.47 microfarad
Capacitor 82—0.15 microfarad
Capacitor 83, 96—0.68 microfarad
Capacitor 89—0.33 microfarad
+V, −V—15 volts
Stage 48—LM 318
Stage 55—LM 318
Stages 64 and 70—LM 1458
Stages 76 and 81—LM 1458
Stages 88 and 92—LM 1458

To change the integrated area, reference sources 107, 108, 116, and 117 are simply readjusted. With reference to FIG. 2 and assuming that the beam forming the lines moves from bottom to top and from left to right, adjustment of reference source 107 changes the lower horizontal boundary of the integrated area, adjustment of reference source 108 changes the upper horizontal boundary of the integrated area, adjustment of reference source 116 changes the left vertical boundary of the integrated area, and adjustment of reference source 117 changes the right vertical boundary of the integrated area. Assuming that the integrated area has a horizontal width W, a vertical height X, is spaced a distance Y from the horizontal upper boundary of the screen, and is spaced a distance Z from the vertical left-hand boundary of the screen, W, X, Y, and Z can be varied by the operator of the scanner by readjustment of reference sources 7, 8, 16, and 17. In the course of medical ultrasound diagnosis, it has been found particularly advantageous to vary Y on a patient-by-patient basis because of differences in organ depth from the skin surface. It is not so important to vary Z by adjusting the reference sources, because this adjustment can be made by repositioning the transducer array on the patient. Similarly, for a particular body organ, it would normally not be necessary to adjust the reference sources to vary W and X because the size and extent of motion of an organ would normally be relatively constant from patient to patient. Nevertheless, if variations in W, X, Y, and Z are necessitated, they can easily be made by readjusting the appropriate reference sources. For most applications, X would normally vary between 5% and 20% and W would normally vary between 25% and 50%.

In summary, a video signal is generated representative of an image or an object in an image whose motion is to be detected, e.g., by array 10, clock 12, transmitter 14, switching circuitry 16, and receiver 18. In the case of the apparatus of FIG. 1, array 10 is positioned so it intercepts ultrasound echoes that reflect off of the region under examination. Assuming motion of an object comprising less than the entire image represented by the video signal is to be detected, the integrated area is adjusted in size and screen position to optimize detection of such motion. The portion of the video signal corresponding to the integrated area is integrated on a frame-by-frame basis and the integration values resulting therefrom are compared, preferably with the aid of data storage device 24, for the purpose of detecting motion of the object. To detect motion of a different object, array 10 is repositioned to intercept echoes from a region including such object and the integrated area is readjusted in size and screen position to optimize motion detection thereof.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, although the invention is disclosed in an electronic scanning system, it could be employed in connection with a mechanical linear or sector scanner, or a manually movable probe scanner. It could also be employed to detect motion of objects in video signals from other types of systems such as a closed circuit television security system. It is preferable to integrate only part of the video signal and to adjust that part to suit the object being detected; but the invention could also be used to integrate the entire video signal, thereby detecting movement of the entire image represented by the video signal. As used herein, the term "successive repetitions of the video signal" refers to two or more repetitions directly or indirectly following one after the other. If the repetitions indirectly follow one after the other, the interval between integrated repetitions must be small enough to satisfy the sampling theorem as to the speed of the examined object.

What is claimed is:

1. A method for detecting motion of an object comprising the steps of:
   generating a repetitive video signal representative of the object at successive points in time;
   integrating at least a portion of successive repetitions of the video signal;
   comparing the successive integrations with each other; and
   changing the integrated portion of the video signal in order to optimize motion detection for the size and extent of motion of the object.

2. The method of claim 1, in which the integrating step integrates a portion only of successive repetitions.

3. The method of claim 2, in which the generating step generates a video signal composed of a plurality of adjacent lines that form repetitive frames and the integrating step integrates the same portion of a number of adjacent lines fewer than the said plurality of lines that form a frame.

4. The method of claim 3, additionally comprising the step of changing the integrated portion of each line to optimize motion detection for the size and extent of motion of the object.

5. The method of claim 4, additionally comprising the step of changing the number of integrated lines to optimize motion detection for the size and extent of movement of the object.

6. Apparatus for detecting motion of an object represented by a video signal composed of a plurality of lines forming frames at successive points in time, the apparatus comprising:
   means for integrating a portion of each line of the video signal during a first integrating period to form a line integration signal;
   means for storing the value of the line integration signal at the end of each first integrating period to form a line summation signal;
   means for integrating the line summation signal during a second integrating period equal to a plurality of lines of each frame of the video signal to form a frame integration signal;
   means for storing the value of the frame integration signal at the end of each second integrating period to form a frame summation signal; and
   means for adjusting the duration and phase of the first integrating period.

7. The apparatus of claim 6, additionally comprising means for storing the frame summation signal.

8. The apparatus of claim 6, additionally comprising means for filtering the frame summation signal.

9. The apparatus of claim 8, in which the filtering means comprises means for separating the high-frequency components of the frame summation signal from the remainder thereof.

10. The apparatus of claim 6, additionally comprising means for adjusting the duration and phase of the second integrating period.

* * * * *